United States Patent [19]

Hughes

[11] Patent Number: 4,613,162

[45] Date of Patent: Sep. 23, 1986

[54] MISALIGNMENT TIEBACK TOOL - NON-ROTATING CASING

[75] Inventor: David W. Hughes, Houston, Tex.

[73] Assignee: Vetco Offshore Industries, Inc., Ventura, Calif.

[21] Appl. No.: 659,605

[22] Filed: Oct. 12, 1984

[51] Int. Cl.[4] ............................................. F16L 21/00
[52] U.S. Cl. ..................................... 285/27; 285/89; 285/376; 166/242; 166/380
[58] Field of Search ................. 285/27, 377, 362, 361, 285/396, 402, 89, 376, 360; 166/242, 380, 345

[56] References Cited

U.S. PATENT DOCUMENTS

| | | | |
|---|---|---|---|
| 1,372,238 | 3/1921 | Kreiter | 285/89 |
| 1,778,739 | 10/1930 | Wheaton | 285/362 X |
| 2,104,808 | 1/1938 | Neuhaus et al. | 285/402 X |
| 2,107,165 | 2/1938 | Rice | 285/402 X |
| 3,322,443 | 5/1967 | Brown | 285/361 X |
| 4,043,575 | 8/1977 | Roth | 285/377 X |
| 4,343,495 | 8/1982 | Nobileau et al. | 285/39 |

FOREIGN PATENT DOCUMENTS 12362  6/1910  France ............................ 285/33

Primary Examiner—Thomas F. Callaghan
Attorney, Agent, or Firm—Joseph R. Dwyer

[57] ABSTRACT

A tieback tool 10 and method for connecting conductors 12 to the well system 14 including a body member 36 having dogs 46 for engagement with J-slots 30 in the well system. Entry of some of the dogs 46 in the J-slots 30 during initial stabbing directs and aligns the remaining dogs into the respective J-slots 30. The body 36 is provided with an externally threaded ring rotatable by a running tool 80 after full engagement of the J-slots 30 by the dogs 46 to lock the dogs 46 in the J-slots 30 to clamp the tieback tool in alignment with the well system 14 and to compress a seal ring 60 between the tieback tool 10 and the well system 14.

8 Claims, 12 Drawing Figures

MISALIGNMENT TIEBACK TOOL - NON-ROTATING CASING

RELATED APPLICATION

U.S. application Ser. No. 659,603 filed Oct. 12, 1984 by David W. Hughes and Lionel J. Milberger for MISALIGNMENT TIEBACK TOOL - ROTATING CASING.

BACKGROUND OF THE INVENTION

This invention relates to offshore oil production apparatus and, in particular, to a tieback tool and method for connecting a tieback conductor (also referred to as tieback casing) to a subsea well.

Offshore oil wells may be drilled from a drilling vessel or rig and thereafter produced to a fixed platform. Typically, once a well is drilled to depth, it is plugged, a protective cap installed and the drilling vessel moved to another well location. The fixed platform is then moved to a position over the well, the cap removed and tieback conductors are run from the platform deck to the well. Tubing is then run, surface production trees installed, and the well produced in the conventional manner.

A complication comes about, however, because it is nearly impossible to align the fixed platform precisely over the well system and although the tieback conductor string runs through the guides at various elevations, offset still occurs and the problem is particularly acute where there is angular misalignment in the vicinity of the well system where the tieback conductor is to be joined to the well.

Funnels have been used in tieback tools to overcome the alignment problem and prevent damage to threads either in the well system or in the tool as they were being engaged as shown, for example, in U.S. Pat. Nos. 4,343,495 and 4,408,782. These funnels aligned the tool with the well system prior to engagement of the mating threads. After alignment, additional tools were used to thread the tieback tool into the system and to activate the seals therein. Even with such a funnel and additional tools, the existing tieback tools cannot be engaged if there is a large angular misalignment in excess of 2° and attempts to make up the joint with such misalignment resulted in improperly loaded threads and galling thereof.

SUMMARY OF INVENTION

The tieback tool and method for connecting tieback conductors to the well system, in this case a mudline casing hanger, which overcomes the aforesaid problem of misalignment includes a body having dogs (also called tabs) for engagement with J-slots in the casing hanger. The throats of the J-slots are wide enough to compensate for misalignment of the tool relative to the casing hanger as the tool approaches the well by allowing entry of some of the dogs in the initial stabbing of the tool to the casing hanger which then directs the remaining dogs into their respective J-slots for final connection of the tool to the hanger.

The body of the tool has a tapered surface which acts as guide in the initial stabbing and is provided with an externally threaded ring rotatable by a running tool after full engagement in the J-slots by the dogs to lock the dogs in the J-slots, to clamp the tieback tool in precise alignment with the casing hanger, and to compress the seal between the tool and casing hanger.

As will be apparent to those skilled in the art, that since it is the dogs and the J-slots which make the connection between the tool and the casing hanger, that since the threads on the tool body and ring are used only after the connection is made, and that since there is never any disengagement of the threads, reliance on the ability to make a thread connection with mating threads, at the time the tool is connected into the system, is eliminated. Too, since the threads are on the tool and not in the well system, the threads can be retrieved if they become damaged.

In this invention, the tieback conductor string is not rotated to connect and disconnect the tieback tool to and from the casing hanger, whereas in the invention of the Hughes and Milberger application, supra, the tieback conductor string is rotated to connect and disconnect the tieback tool to and from the casing hanger, but both utilize the concept of J-slots and a threaded ring in the tieback tool to align and lock the tool on the casing hanger. Rotation and non-rotation of the tieback conductor means high torque since high torque is required to operate the Hughes and Milberger invention. Only a slight (approximately 1/6) of a turn of the tieback connector is required to move the dogs in the J-slots in this invention.

It should also be apparent that while this is called a tieback tool, it also could be used as a running tool where J-slots are used in the well system.

DETAILED DESCRIPTION

Figure 1:
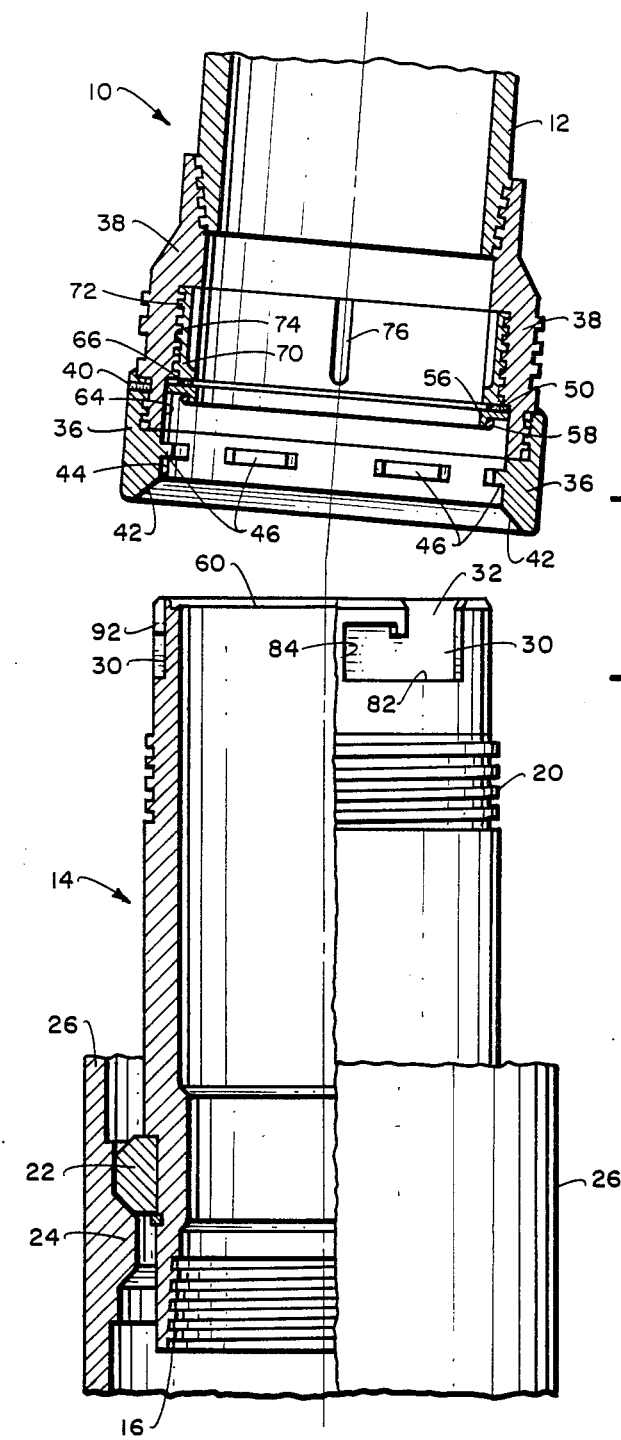
FIG. 1 illustrates the tieback tool in angular misalignment with the casing hanger as the tieback tool approaches the well.
Figure 2:
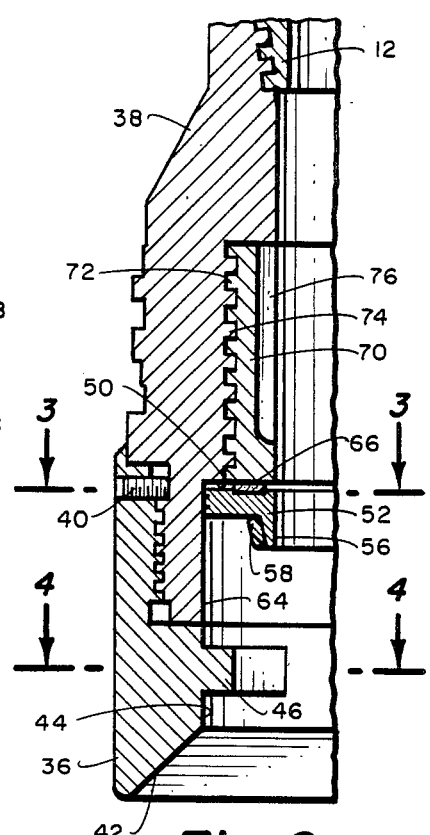
FIG. 2 is an enlarged detailed cross-sectional view showing the dogs, the ring and seals.
Figure 3:
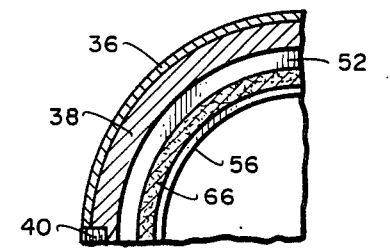
FIG. 3 is a view taken along line 3—3 of FIG. 2 showing a portion of the seal ring and the bearing thereon.
Figure 4:
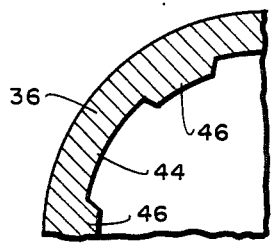
FIG. 4 is a view taken along line 4—4 of FIG. 2 showing a portion of tool body member illustrating particularly the dogs thereon.
Figure 5:
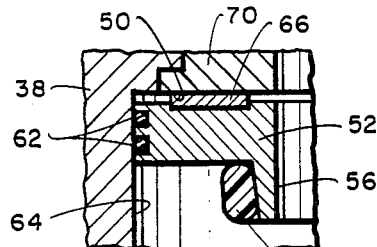
FIG. 5 is a cross sectional view of the seal assembly (ring and seal ring) enlarged to show the details thereof.
Figure 6:
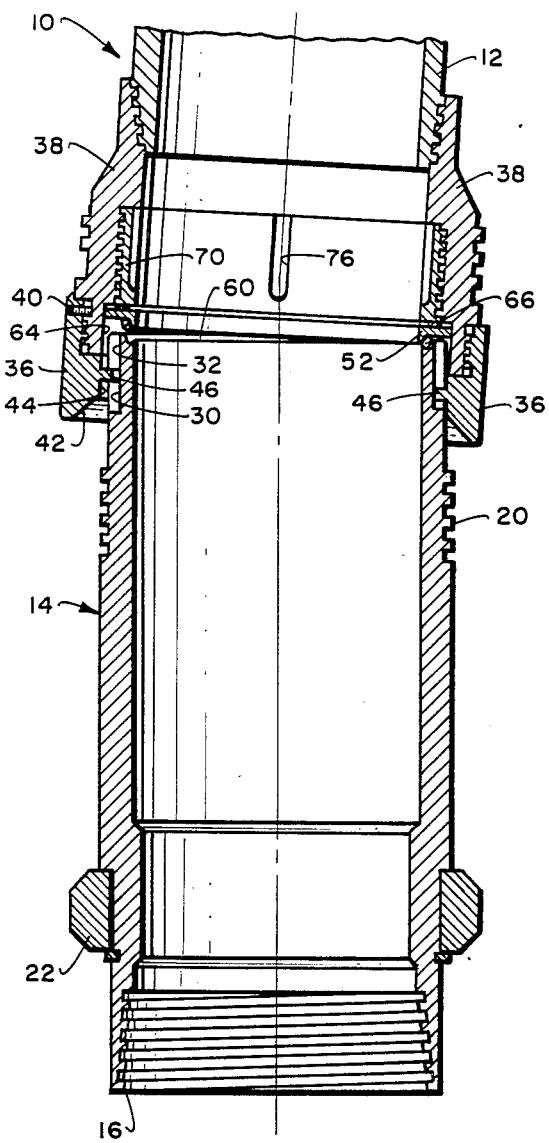
FIGS. 6, 7, 8, and 9 show the next stage in the connection of the tieback tool to the casing hanger with FIG. 8 showing the initial entry of one in the J-slot of the casing hanger, and FIG. 9 showing one of the dogs seated on the bottom of the J-slot.
Figure 7:
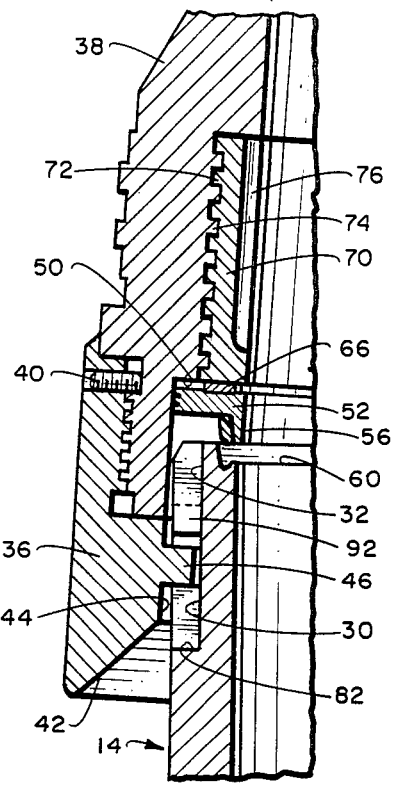

In the drawings particularly with reference to FIGS. 1-5 it can be seen that the tieback tool 10 is rigidly connected and sealed to the lower end of one external tieback conductor (pipe) 12 which is to be connected and sealed onto a casing hanger 14. Tieback conductor 12 is the lower one of a string of conductors which are anchored to the platform and put in tension. Casing hanger 14 was previously installed and with casing (not shown) connected by tapered threads 16 on its lower end.

Also, prior to the approach of the tieback tool as shown in FIG. 1, a protective cap, threaded on external threads 20 on the casing hanger, was removed.

The previously installed casing hanger 14 is shown with its external landing ring 22 engaging a landing profile 24 on an outer casing hanger 26. Only the landing area of the outer casing hanger 26 is shown in FIG. 1. Typically, outer casing hanger 26 is a 30 inch hanger connected to 30 inch casing cemented in a previously drilled hole. Casing hanger 14 supports 20 inch casing, which is also cemented in a previously drilled hole. The casing hanger 14, in turn, has a profile for another internal casing hanger, typically 13⅜ inch, which can be connected to other casing in the well. More casing hangers than that shown may yet be installed.

The top of the casing hanger 14 is provided with J-slots 30 (six such slots in the embodiment shown), which have throats 32 wide enough to allow for large angular misalignment between the casing hanger and the tieback tool 10.

The tieback tool 10 itself comprises a cylindrical outer cup-like body member formed by threading an internally threaded throat and locking ring 36 onto the lower end of an externally threaded body 38. If desired, the ring 36 may be fastened to the body 38 by set screws 40 (one shown). The ring has an outwardly tapered conical surface 42 on the mouth or end opposite the end of the body connected to the tieback conductor 12. Surface 42 forms a tapered guide which presents a diameter larger than the diameter of the casing hanger 14 to aid in stabbing the tieback tool onto the casing hanger. A short distance above the conical surface 42, the inner wall 44 of the ring 36 is provided with a plurality of radially inwardly extending dogs 46 for engagement with the throats 32 of the J-slots in the casing hanger. The number of dogs 46 corresponds, of course, with the number of J-slots selected. A short distance above or further within the cup-like body, specifically the body 38, a downwardly facing ledge 50 is formed to seat and prevent upward movement of a relatively thin ring 52, the outer diameter of which substantially equals the outer diameter of the casing hanger 14 at its top edge. Ring 52 is part of a seal assembly for the tool and casing hanger and also functions to finally align and lock the tool onto the casing hanger as will be clear hereinafter.

Accordingly, the radial inner edge of the ring 52 has a downwardly extending lip 56 which surrounds a resilient seal ring 58 which will seat within an upwardly opening recess 60 in the casing hanger and which will be squeezed by the ring, lip and recess to provide a fluid tight seal between the casing hanger and the tool when the tool is fully connected to the casing hanger. The cross-sectional configuration of the seal ring 58 conforms to the configuration of the recess 60. Ring 52 is retained within the body by a pair of O-ring seals 62, disposed within suitable grooves, which engage the inner wall 64 of the body 38 with sufficient friction to retain the ring therein. The top surface of the ring 52 has a relatively thin ring 66 of a bearing material, such as Turcite, to permit an actuating ring 70 to rotate easily. This latter ring has external threads 72 which mate with internal threads 74 on the inner surface of the wall of the body 38. This ring is provided with a plurality of vertical upwardly opening slots 76 adapted to be engaged by a running tool 80 (shown in phantom) to rotate this ring and lock the tieback tool onto the casing hanger once fully aligned as will be more clearly understood from the following description.

Figure 8:
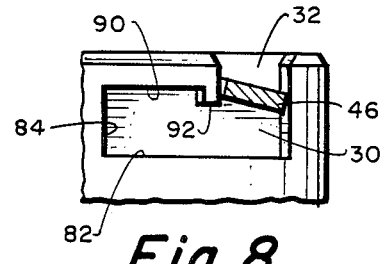

FIGS. 6, 7, 8 and 9 show the tieback tool initially stabbed onto the casing hanger. In this stage, the center line of the misalignment tool is still misaligned with respect to the center line of the well system, but some of the dogs 46 have entered the throats 32 of the J-slots 30 and have come to rest on the bottom surface 82 thereof. The remainder of the dogs are above, or have just entered, the throats 32 as more clearly shown in FIG. 8. FIG. 8 also shows the width of the throats relative to the width of the dogs to facilitate entry as mentioned supra. (The misalignment tool is rotated slightly as viewed from the platform by the tieback conductor, if the dogs happen to have landed on the top of the casing hanger between the throats.)

Figure 9:
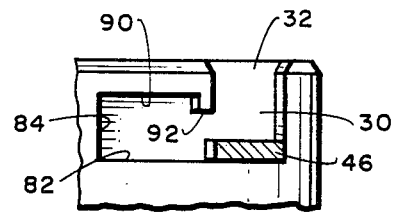

With the orientation of the tool by operation by the dogs and throats, continued downward movement of the tool will cause the remainder of the dogs to come to rest on the bottom surfaces 82 of all of the J-slots. At this time, the misalignment tool is aligned with the casing hanger. One such dog 46 resting on the bottom surface 82 is shown in FIG. 9.

When the misalignment tool is thus fully aligned and the dogs 46 are resting on the bottom surfaces 82 of all the J-slots, the tieback conductors are rotated slightly (about 1/6 of a turn) to cause the dogs to move across the J-slots and engage the vertical walls 84 of the slots. At this time, the running tool 80, having keys 86 of a width and length commensurate with vertical slots 76 in the actuating ring 70, will be positioned such that the keys enter the slots and the actuating ring 70 will be rotated clockwise by the running tool. See FIG. 10. This rotation threads the actuating ring on the mating threads 72, 74 and moves the ring 52 until the seal ring 58 is squeezed into the recess 60 of the casing hanger as clearly illustrated in FIG. 11 and the dogs are near or almost touching the upper surface 90 of the J-slots as shown in FIG. 12. Actually, since the actuating ring is resting on the top of the casing hanger when fully aligned, it is the tool 10 that is raised so that the dogs 46 move toward the upper surfaces 90 to squeeze the seal ring 58 into the recess 60.

Figure 10:
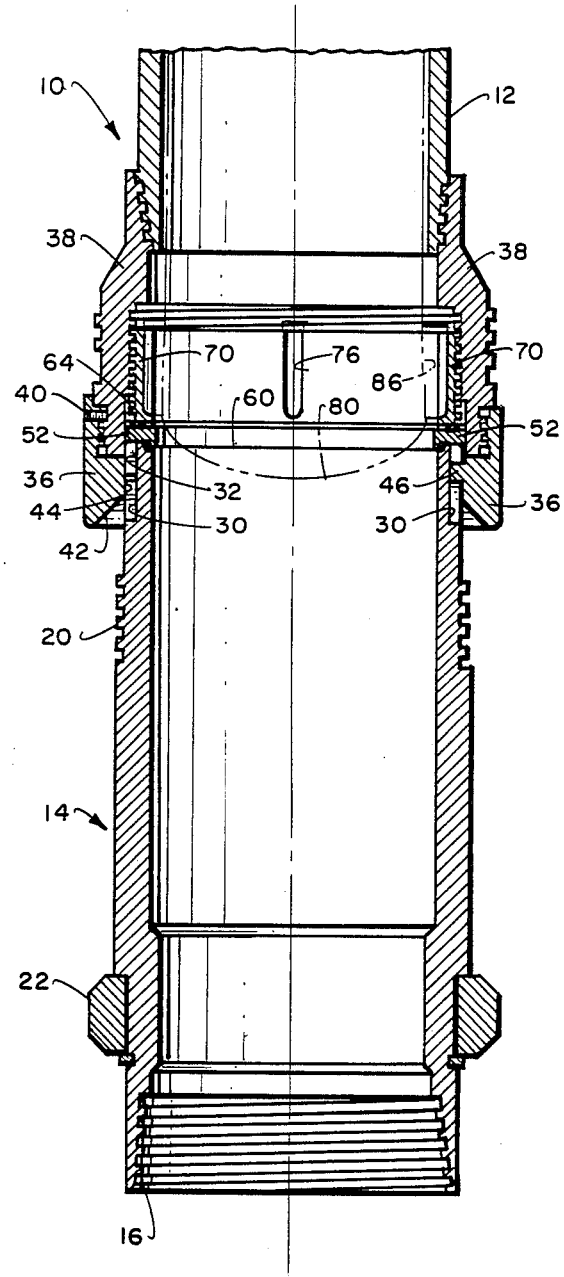
FIGS. 10, 11, and 12 illustrate the tieback tool fully connected to the casing hanger with FIGS. 11 and 12 showing the relationship between the ring, J-slot and the seal between the tieback tool and the casing hanger.
Figure 11:
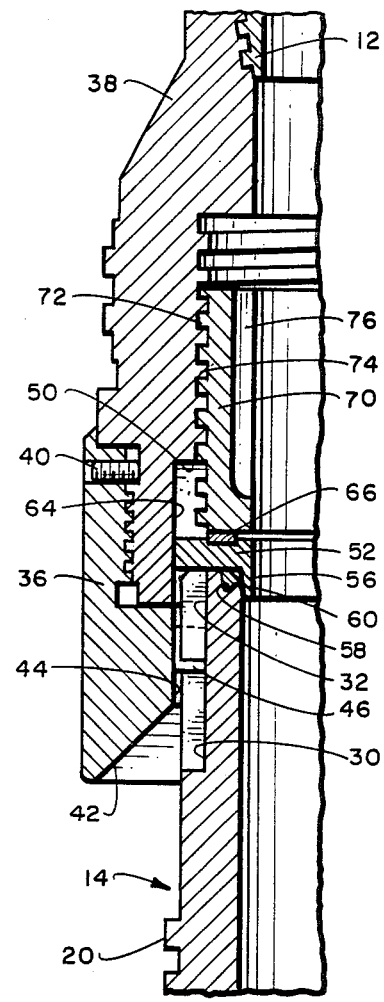
Figure 12:
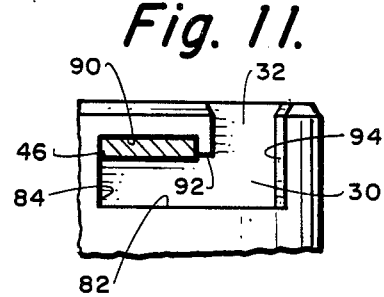

Thus, FIGS. 10 and 11 show the joint fully made up with the dogs in their upper most position and with the top of the casing squeezing the seal ring 58 to form the leak-proof seal between the tool and the casing hanger.

Retrieval of the misalignment tool is simply the reverse of making-up of the connection. The running tool is rotated counterclockwise lowering the tool 10. The dogs will initially engage the locking tabs 92 of the J-slots as shown in FIG. 9 but continued rotation of the actuating ring in response to rotation the running tool will cause the dogs to bypass these locking tabs and engage the right hand walls 94 of the J-slots until dogs align with the throats 32 to permit upward movement of the tieback tool free of the casing hanger. The running tool in then removed and the tieback tool is withdrawn.

Thus, the foregoing discloses a tieback tool having a lockdown means which is not only used to overcome any misalignment between the tieback tool and the well system, it is also used to lock and seal the tieback tool onto the system with little danger of thread damage.

I claim:

1. A tieback tool for connecting a tieback conductor to a subsea well system comprising:
    a hollow tubular body member connected to the tieback conductor, lockdown and aligning means on said tubular body member for aligning and locking said tool on said well system, including, ring means threadably engaged within said tubular body member, radially inwardly extending dogs on said tubular body member and adapted to engage one or more locking means on said well system, upon initial engagement of said tubular body member with said well system to commence the process of alignment of said tool with said well system by resting on a bottom surface in said locking means, said dogs and said ring means being arranged so that rotation of said ring means locks said radially extending dogs in said locking means after all of said dogs have been received in said locking means and are resting on said bottom surfaces by lifting said dogs off said bottom surface and into a locked position within said locking means.

2. The tieback tool as claimed in claim 1 wherein locking means on well system comprises a plurality of J-slots with throats opening upwardly towards said tool, any one of which throats may receive one of said dogs and said bottom surfaces, or top surfaces and locking tabs between said top surfaces and said throats whereby said locking tabs lock said dogs in said J-slots when said ring lifts said dogs within said J-slots.

3. The tieback tool as claimed in claim 2 wherein said ring means is provided with means adapted to receive a running tool capable of rotating said ring means.

4. The tieback tool as claimed in claim 3 wherein said well system includes a casing hanger and said J-slots are located in said casing hanger.

5. The tieback tool as claimed in claim 4 wherein said tubular body member includes a conically tapered surface to aid in stabbing said tool onto said well system.

6. The tieback tool as claim in Claim 5 further including sealing means on said ring means engagable by said well system when said tieback tool is locked into said well system to form a fluid tight seal between the tool and the well system.

7. In a subsea well system, a method of connecting tieback conductors between the subsea well and a surface assembly comprising the steps of:

providing the subsea well with a plurality of well locking means, providing a tieback tool on one end of a string of tieback conductors, said tieback tool having a plurality of tool locking means, initially engaging some of the tool locking means with some of the well locking means, thereby initially aligning the tool with the subsea well and aligning the remainder of the tool locking means with the well locking means, lowering the tool until all of said tool locking means are fully received in said well locking means, rotating a ring in said tool by a running tool to raise said tool locking means into engagement with a top wall in said subsea well locking means, and forming a seal between the tool and said subsea well.

8. A tieback tool for connecting a tieback conductor to a subsea well system, said tool having an opening which telescopes over a tubular member of said well system, said tool comprising:

a hollow tubular body member connected to the tieback conductor, combined lockdown, aligning and sealing means on said tubular body member for aligning and locking said tool on said well system, said combined lockdown, aligning and sealing means comprising:

a plurality of locking dogs on said tubular body member and extending radially inwardly of said tubular body member, a ring threadably received in said tubular body member and rotatable toward said opening, and sealing means on said ring and engageable with the top of said tubular member when said ring rotates toward said opening, said tubular member having J-slots with throats opening upwardly to receive said dogs, and further having bottom surfaces, top surfaces, and locking tabs between said throats and said top surfaces, said dogs and said ring means being arranged so that at least one dog enters one of said throats and comes to rest on one of said bottom surfaces, whether or not said tubular body member and said tubular member are aligned coaxially, and so that each of the remainder of said dogs enter the remainder of said throats and come to rest on the remainder of said bottom surfaces, and so that rotation of said ring means toward said opening locks said radially extending dogs in said J-slots by lifting each said dog toward each said top surface on the side of said locking tabs away from said throats, thereby locking said dogs in said J-slots and whereupon said sealing means engages the top of said tubular member to seal said tool onto said well system.

* * * * *